United States Patent Office 3,823,190
Patented July 9, 1974

3,823,190
PROCESS FOR THE MANUFACTURE OF CYCLOALKENONES
Peter Oberhänsli, Kusnacht, Switzerland, assignor to Givaudan Corporation, Clifton, N.J.
No Drawing. Filed Mar. 5, 1970, Ser. No. 16,925
Claims priority, application Switzerland, Mar. 10, 1969, 3,608/69
Int. Cl. C07c 45/18
U.S. Cl. 260—586 R          4 Claims

ABSTRACT OF THE DISCLOSURE

There is provided a novel process for the preparation of certain known methyl cycloalkenones which are useful as odorants of the jasmine type.

SUMMARY OF THE INVENTION

The present invention is concerned with a process for the manufacture of cycloalkenones of the general formula

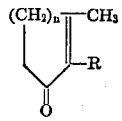

IV wherein R signifies a hydrogen atom, an alkyl group containing 1–8 carbon atoms, an alkenyl group containing 2–8 carbon atoms or alkynyl group containing 2–8 carbon atoms and $n=1$ or 2.

The process in accordance with the invention is characterised in that a cycloalkenone ester of the general formula

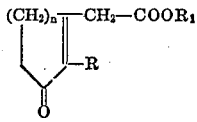

III wherein R and n signify the same as above and $R_1$ is an alkyl group of 1–8 carbon atoms, is hydrolyzed and the hydrolysis product is decarboxylated in acid medium.

The hydrolysis can be carried out acidically by saponification.

Suitable for the acidic hydrolysis are the same acids as are mentioned later on for the decarboxylation.

DESCRIPTION OF THE PREFERRED EMBODIMENTS

The saponification may be carried out by treating a solution of the cycloalkenone ester III in a water miscible solvent with an aqueous alkaline solution and heating under reflux.

It is preferred to utilize alkanols as the solvent, suitably alkanols of 1–8 carbon atoms, especially suitable are methanol and ethanol. The preferred alkalis are alkali hydroxides such as sodium and potassium hydroxide which are preferably utilized at moderate strength, suitably 1–3N. While an excess of alkali is not critical it is preferred to utilize an excess of up to 2 equivalents. The mixture of the aqueous alkali and the ester/alkanol solution, the latter preferably containing 5–30 percent by weight of ester, are heated preferably for at least one hour under reflux, preferably for 3–5 hours.

The acidic hydrolysis is carried out by adding acid, suitably 1N–10N aqueous acid, to a solution of the ester of similar concentration in a similar solvent to that used in the saponification. The amount of acid used may vary from catalytic amount (i.e. 0.01N of total solution) up to several equivalents. It is preferred to heat the reaction mixture under reflux for from 1–10 hours, suitably for 2–4 hours, however, the reaction will also take place at room temperature.

Suitable as acids for the decarboxylation of the hydrolysis product are mineral acids such as sulphuric acid, nitric acid, phosphoric acid, but especially hydrochloric acid. The acidification, suitably to a pH of 1–6, preferably to a pH of about 3–4, is expediently effected by addition of concentrated acid to the hydrolysis product which had been cooled to temperatures of about 0–20° C. and freed from most of the organic solvent. An increase of the temperature can be prevented by conventional measures such as cooling the reaction mixture with ice. The decarboxylation manifests itself in the release of carbon dioxide.

The cycloalkenone IV obtained by hydrolysis and decarboxylation can be isolated according to methods which are known per se, for example by extraction with ether and subsequent fractional distillation immediately after completion of acidification. The distillation will complete the decarboxylation step.

The cycloalkenone esters of general formula III can advantageously be obtained from cycloalkenol ethers of the general formula

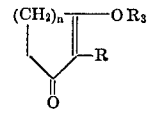

I wherein R and n signify the same as above and $R_3$ represents an alkyl group, by reaction with a malonic acid ester of the general formula

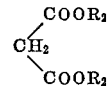

II wherein $R_2$ signifies an alkyl group of 1–8, suitably 1–4, preferably 1–2 carbon atoms, in alkaline, anhydrous medium.

In this case, the reaction of the enol ether of general formula I with the malonic acid ester of general formula II is expediently effected in an organic solvent. Suitable as solvents are, for example, ethers such as dialkyl ethers or cyclic ethers (e.g. tetrahydrofuran or dioxan). Particularly suitable are alcohols and, in turn, among these those of the general formula $R_1OH$, $R_1$ having the above significance (methanol or ethanol being the alkanols of choice). The use of alcohols as solvents is particularly expedient for the reason that alkaline-reacting reaction media may be produced in a simple manner from alcohols by alcoholate-formation. Thus, by addition of an alkali-metal such as potassium or, expediently, sodium to the alcohol there can be obtained a solution of the alcoholate in the alcohol (e.g. sodium methylate in methanol) which is eminently suitable as the alkaline, anhydrous reaction medium.

For the generation of the necessary alkalinity of the anhydrous reaction medium, apart from alcoholates, there also come into consideration other alkaline-reacting substances, for example alkali hydrides such as sodium hydride or alkyl- or aryl-alkali compounds such as phenyllithium.

When using alcoholate/alcohol solutions (e.g.

$$R_1O^-/R_1OH$$

solutions); as a consequence of re-esterification, then generally an ester of formula III which contains as the ester group the alkyl group ($R_1$) of the alcohol ($R_1OH$) used as the solvent is formed as the main product of the process: Thus, for example, on reaction of an enol ether I with malonic acid dimethyl ester there will result an ester of formula III with $R_1$=ethyl when the reaction is carried out in an ethylate/ethanol solution.

The reaction may preferably be carried out using equimolar or excess amounts of malonic ester and alkali relative to the enol ether, however from 1–2 mols of malonic ester and from 1–2.5 mols of alkali per mole of enol ether represent the preferred operating ranges.

The reaction of the enol ether I with the malonic acid ester II under the stated reaction conditions is expediently effected by heating the reaction mixture for up to 100 hours under reflux. It has been found that the reaction velocity is to a certain extent dependent on the steric hindrance exerted by the R-substituents. Thus, for example, the reaction velocity for starting materials with R=methyl is greater than that for those with R=n-pentyl. Moreover, the reaction velocity is generally also greater for 5-rings ($n$=1) (reaction time up to 50 hours) than for 6-rings ($n$=2) (reaction time up to 100 hours). After completion of the reaction, the ester of formula III can be isolated in a conventional manner if desired. In so doing, one expediently proceeds as follows: The reaction mixture is cooled and thereupon neutralised, preferably with anhydrous acid. Particularly suitable is anhydrous acetic acid (glacial acetic). However, other acids also can be taken into consideration, such as other carboxylic acids, as well as sulphonic acids and anhydrous mineral acids such as hydrochloric acid, sulphuric acid, phosphoric acid. The desired ester III can be obtained in pure form from the neutralised reaction mixture by extraction and fractional distillation.

The enol ethers of general formula I can in turn be obtained from corresponding normally enolized 1,3-diketones, e.g. by action of diazomethane in etheral solution, conveniently at room temperature; under the influence of dimethylsulfate in alkaline medium, conveniently at room temperature; or using methanol and an acid catalyst, e.g. p-toluene-sulfonic acid, at the reflux temperature of the reaction mixture.

It is not, however, necessary to employ the cycloalkenone ester III in pure form for the hydrolysis and decarboxylation operation. On the contrary, according to a preferred embodiment of the process in accordance with the invention the anhydrous alkaline and, if desired, still hot solution of the cycloalkenone ester III, as it exists after the reaction of the enol ester I with the malonic acid ester II, is treated directly with aqueous alkali. When using an alcoholate/alcohol solution for the reaction of the enol ether I with the malonic acid ester II, an aqueous-alcoholic alkali solution will thus exist after the addition of aqueous alkali.

Examples of alkyl groups are: methyl, ethyl, propyl, isopropyl, n-butyl, isobutyl, tert. butyl, pentyl, hexyl, heptyl, octyl. Examples of alkenyl groups are: vinyl, allyl, methallyl, pentenyl (e.g. 2-pentenyl). Examples of alkynyl groups are: ethynyl, propargyl, pentynyl (e.g. 2-pentynyl).

On practical grounds, lower alkyl groups as represented by the symbols $R_1$, $R_2$ and $R_3$ expediently contain 1–4 C-atoms.

The cycloalkenones of general formula IV form a group of odorants, e.g. comprising those of the jasmine type. The compounds provided in accordance with the following examples are known odorants and have been compounded with carriers known to those skilled in the art for use as perfumes, colognes, powders, soaps and the like. (See for example International Compendium of Aromatic Materials; Hüthig, Heidelberg (1968), pages 24, 41, 192, 193, 212, 336, 351; Swiss Patent Specification No. 439,274.)

In the following examples, the temperatures are stated in degrees Centigrade.

EXAMPLE 1

(a) A sodium methylate solution is manufactured from 2.8 g. of sodium and 75 ml. of dry methanol. To this solution there are added 14.7 g. of malonic acid dimethyl ester and 10.1 g. of 3-methoxy-2-pentyl-2-cyclopenten-1-one and the mixture is boiled at reflux for 26 hours.

(b) A solution of 5.65 g. of potassium hydroxide in 18.5 ml. of distilled water is added dropwise in the course of 3 minutes to the above reaction mixture containing [2-pentyl-3-keto-1-cyclopenten-]yl acetic acid methyl ester which was formed and the mixture is boiled at reflux for a further 2 hours. Most of the methanol is evaporated off and the cooled residue is made acidic with conc. hydrochloric acid with ice-cooling, whereby decarboxylation takes place. The mixture is extracted twice with ether in a separating funnel. The ether extracts are washed with water, dried and evaporated. By distillation there are obtained 8.1 g. of 3-methyl-2-pentyl-2-cyclopenten-1-one (dihydrojasmone) of b.p. 81–82°/0.3 mm. Yield 88%.

EXAMPLE 2

(a) Sodium methylate is manufactured from 4.7 g. of sodium and 150 ml. of dry methanol. To this solution there are added 24.6 g. of malonic acid dimethyl ester and 30 g. of 3-methoxy-2-hexyl-2-cyclopenten-1-one and the mixture is boiled at reflux for 44 hours.

(b) A solution of 13.2 g. of potassium hydroxide in 40 ml. of distilled water is added dropwise in the course of 5 minutes to the above reaction mixture containing [2-hexyl-3-keto-1-cyclopenten-]yl acetic acid methyl ester which was formed. The mixture is boiled at reflux for a further 2 hours, then 75 ml. of distilled water are added and the methanol is distilled off in vacuum. The cold residue is acidified with 40 ml. of conc. hydrochloric acid (whereby decarboxylation occurs) and extracted with ether. The ether extract is washed with water and dried and the ether evaporated off. By distillation there are obtained 24.3 g. of 3-methyl-2-hexyl-2-cyclopenten-1-one of b.p. 82–86°/0.3 mm.; $n_D^{20}$=1.4783; yield 88%.

EXAMPLE 3

(a) A sodium methylate solution is manufactured from 7.7 g. of sodium and 200 ml. of dry methanol. To this solution there are added 40.0 g. of malonic acid dimethyl ester and 24.0 g. of 3-methoxy-2-allyl-2-cyclohexen-1-one and the mixture is boiled at reflux for 72 hours.

(b) A solution of 15.5 g. of potassium hydroxide in 50 ml. of distilled water is added dropwise in the course of 3 minutes to the reaction mixture containing [2-allyl-3-keto-1-cyclohexen-]yl acetic acid methyl ester which was formed and the mixture is further boiled under reflux for 4 hours. Most of the methanol is evaporated off and the cooled residue (for the purpose of decarboxylation) is made acidic with conc. hydrochloric acid with ice-cooling. The mixture is shaken twice with ether in a separating funnel. The ether solutions are washed with water, dried and evaporated. By distillation there are obtained 11.5 g. of pure 2-allyl-3-methyl-2-cyclohexen-1-one of b.p. 62–65°/0.3 mm. Yield 51%.

EXAMPLE 4

140 ml. of methanol and 35 g. of [2-pentyl-3-keto-1-cyclopenten-]yl acetic acid methyl ester are put into a 1-liter round flask which contains 17.5 g. of potassium hydroxide in 35 ml. of water and the mixture is held at reflux for 2 hours. Most of the methanol is subsequently distilled off, the residue is cooled and it is diluted with 100 ml. of water. It is then acidified with concentrated hydrochloric acid. The resulting oil is then taken up in ether and the ethereal solution washed twice with water. The ether is distilled off and the residue heated in water-jet vacuum. The resulting dihydrojasmone is subsequently distilled in a column. After separation of the fore-run the product distils at 85° (0.2 mm. Hg), yield 11.5 g. $n_D^{20}=1.4794$.

EXAMPLE 5

80 ml. of methanol and 23.8 g. of [2-octyl-3-keto-1-cyclopenten-]yl acetic acid methyl ester are added to 10 g. of potassium hydroxide in 20 ml. of water and the mixture is held at reflux for 2 hours. Most of the methanol is subsequently distilled off, the residue cooled, diluted with 60 ml. of water and the mixture acidified with concentrated hydrochloric acid. The resulting oil is taken up in ether and the ethereal solution washed twice with water. The solvent is distilled off and the residue heated in waterjet vacuum.

The crude product is distilled and there are obtained 15.9 g. of 3-methyl-2-octyl-2-cyclopenten-1-one of boiling point 96–99°/0.004 mm. Hg [2-octyl-3-keto-1-cyclopenten-]yl acetic acid methyl ester is prepared starting from 3-methoxy-2-octyl-2-cyclopenten-1-one according to the procedure outlined in Example 3.

EXAMPLE 6

A mixture of 0.365 g. of potassium hydroxide in 0.73 ml. of water, 2.92 ml. of methanol and 0.5 g. of 3-keto-1-cyclopenten-yl acetic acid methyl ester is stirred at 50° for 3 hours. The reaction mixture is cooled, acidified with 2N hydrochloric acid and ether extracted. The ether solution is washed with brine, dried and concentrated. By distillation of the residue there results a single fraction of boiling point (airbath) 80–120°/11 mm. Hg. The IR spectrum of the product obtained is identical with that of authentic 3-methyl-2-cyclopenten-1-one. [3-keto-1-cyclopenten-]yl acetic acid methyl ester is prepared starting from 3-methoxy-2-cyclopenten-1-one according to the method outlined in Example 3.

EXAMPLE 7

A solution of sodium methylate is prepared from 245 mg. of sodium and 7 ml. of dry methanol. After the addition of 1.35 g. of dimethyl malonate the resulting mixture is stirred for 30 minutes. 1.2 g. of 3-methoxy-2-allyl-2-cyclopenten-1-one are then added and the mixture is refluxed for 20 hours. To the resulting reaction mixture containing [2-allyl-3-keto-cyclopenten-1-yl]-methyl acetate there are added by dropwise addition, 0.69 g. of potassium hydroxide in 2.1 g. of distilled water. The reaction mixture is then refluxed for 4 hours. The product is then cooled to 0° and acidified at this temperature with hydrochloric acid and extracted with ether. The ethereal solution is washed twice with brine, dried and evaporated. Distillation of the product in a "Kugelrohr" gives 3-methyl-2-allyl-2-cyclopenten-1-one. B.p. 90–120°/0.04 mm. (air bath).

EXAMPLE 8

A solution of sodium methylate is prepared from 23.4 g. of sodium and 660 ml. of dry methanol. 123.8 g. of dimethyl malonate and 96.8 g. of 3-methoxy-2-methyl-2-cyclopenten-1-one are added to the solution, which is then refluxed for 17 hours. The reaction mixture contains (2-methyl-3-keto-1-cyclopentenyl) methyl acetate. 66.4 g. of potassium hydroxide in solution in 200 ml. of distilled water are then added dropwise to the reaction mixture which is thereafter refluxed for a further 4 hours. 330 ml. of water are then added and the major part of the methanol distilled off. The cooled residue is acidified with concentrated hydrochloric acid whereupon partial decarboxylation occurs. The product is extracted twice with ether. The ethereal extract is washed with water, dried and evaporated. On distillation there are obtained 63.1 g. of 2,3-dimethyl-cyclopenten-1-one. B.p. 73–75°/11 mm. Yield: 75%.

What is claimed is:

1. A process for the manufacture of cycloalkenones of the formula

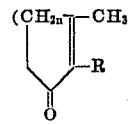

IV wherein R is hydrogen, alkyl of 1–8 carbon atoms, alkenyl of 2–8 carbon atoms, or alkynyl of 2–8 carbon atoms and $n=1$ or 2, which comprises producing a cycloalkenone ester of the general formula

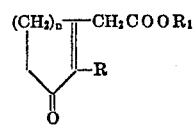

III wherein $R_1$ is alkyl of 1–8 carbon atoms, and R and $n$ signify the same as above, from a cycloalkenol ether of the general formula

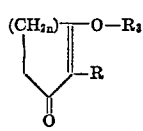

I wherein $R_3$ is alkyl of 1–8 carbon atoms and R and $n$ signify the same as above, by reacting said ether with a malonic acid ester of the general formula

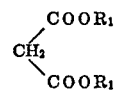

II wherein $R_1$ signifies the same as above, in an alkaline, anhydrous reaction medium; hydrolyzing the cycloalkenone ester of formula III; and decarboxylating the hydrolysis product by acidifying with a mineral acid.

2. Process according to claim 1, characterised in that the solution of an alcoholate $R_1O^-$ in the corresponding alcohol $R_1OH$ ($R_1$ having the above significance) is used as the alkaline, anhydrous reaction medium.

3. The process of claim 1 wherein the hydrolysis and decarboxylation are performed in a single step by addition of a mineral acid to the cycloalkenone ester of formula III.

4. The process of claim 2 wherein the hydrolysis and decarboxylation are performed in a single step by addition of a mineral acid to the cycloalkenone ester of formula III.

References Cited

UNITED STATES PATENTS

| | | | |
|---|---|---|---|
| 2,798,793 | 7/1957 | Moore | 260—468 K X |
| 3,158,644 | 11/1964 | Demole et al. | 260—468 K |
| 3,468,929 | 9/1969 | Bonnett | 260—468 K |

OTHER REFERENCES

House: "Modern Synthetic Reactions," p. 239, 1965.

Moller: "Chemistry of Organic Compounds," pp. 900–901 (1965).

LEON ZITVER, Primary Examiner

N. MORGENSTERN, Assistant Examiner

U.S. Cl. X.R.

252—522; 260—468 K, 496